July 2, 1935.  E. A. STULLER  2,006,659

EMERGENCY TIRE CHAIN

Filed July 12, 1933

Inventor:
Earl A. Stuller,
By Churchill Parker Karlson
Attys.

Patented July 2, 1935

2,006,659

UNITED STATES PATENT OFFICE 2,006,659

EMERGENCY TIRE CHAIN

Earl A. Stuller, Chicago, Ill., assignor to Western Chain Products Co., Chicago, Ill., a corporation of Illinois Application July 12, 1933, Serial No. 679,999

5 Claims. (Cl. 152—14)

The invention relates generally to tire chains and in particular to that type known as emergency chains wherein one or more of the chains may be operatively secured in tire embracing relation without lifting or otherwise moving the wheel.

An object of the invention is to provide a tire chain of this nature embodying new and improved means for preventing slipping or undesired movement of the chain relative to the tire.

More particularly stated, another object resides in the provision of a tire chain device having members loosely mounted on the chain to extend transversely thereof for engagement with opposite sides of a radial supporting part of the wheel assembly, said members being limited by the chain structure against movement longitudinally of the device and against relative separating movement whereby to prevent substantially any circumferential movement of the chain relative to the tire in either direction.

Other objects and advantages will become apparent in the following description and from the accompanying drawing, in which.

Figure 1:
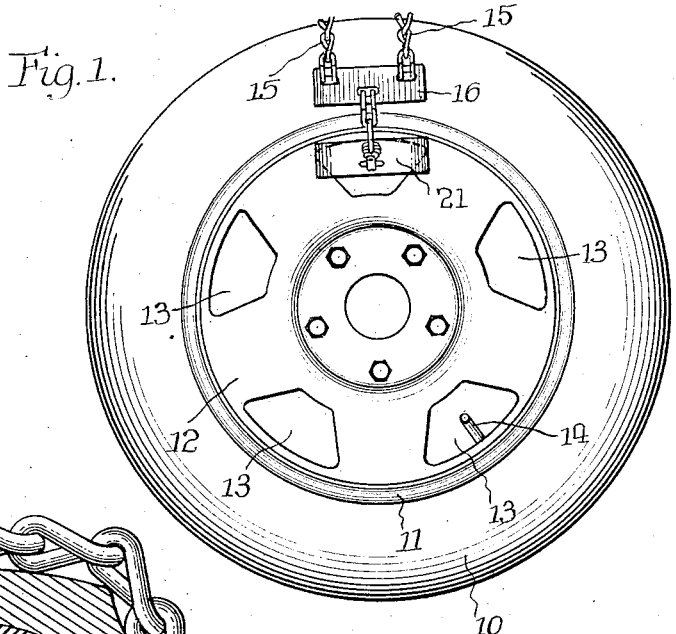
Figure 1 is a side elevation of a tire and wheel assembly with a device embodying the features of the invention mounted thereon.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention is eminently satisfactory for heavy duty purposes and a device embodying the features of the invention is shown as being assembled upon a truck wheel. The wheel assembly comprises a tire 10, rim 11 and radial supporting disk wheel 12 which is usually provided with a number of rather large apertures 13. 14 indicates a valve stem accessible through one of the apertures.

The emergency tire chain device embodies generally an elongated member which is adapted to fit circumferentially about the tire and rim and to extend through one of the apertures in the disk wheel so that the ends may be secured together to hold the device in place. In this embodiment, the device comprises a pair of road engaging members 15, which are preferably chains or the like, dimensioned to extend across the tread portion of the tire. The chains are maintained in spaced relation by a pair of cross bars 16 (Figs. 1 and 2) with which the ends of the chains are connected.

Secured centrally to the opposite sides of the cross bars are connecting means 17 and 18 which are arranged to extend substantially to a meeting point adjacent the rim and preferably opposite to the tread portion of the tire. The connecting means 17 is, in this instance, a chain, the last link of which has a detachable fastening device 19 of any suitable construction connected thereto, the length of the chain 17 being such as to extend from the cross bars 16 through an aperture 13 to locate the fastening device 19 behind and adjacent to the rim. The opposite connecting means 18 also comprises a short length of chain, the end line of which is engageable by the fastening device 19.

Simple means is provided for holding the tire chain device against slipping movement along its length about the tire. In actual operation the tendency of the device toward such movement is quite pronounced and if such movement is not prevented results in a displacement of the road engaging chains 15 from their proper position relative to the tread of the tire. In the present instance, such movement is prevented by the arrangement of parts best seen in Figs. 2 and 3. Thus, the link 20 of the connecting chain 17, which extends through the aperture 13, carries a pair of plates 21 which are apertured as at 22 to receive the link. These plates are mounted loosely on the chain to extend transversely or laterally thereof and are limited against movement longitudinally of the chain and against relative separating movement by the adjacent links of the assembly. The link 20 on which the plates are mounted is preferably somewhat arcuate longitudinally to conform to the bend in the connecting means at this point.

Figure 2:
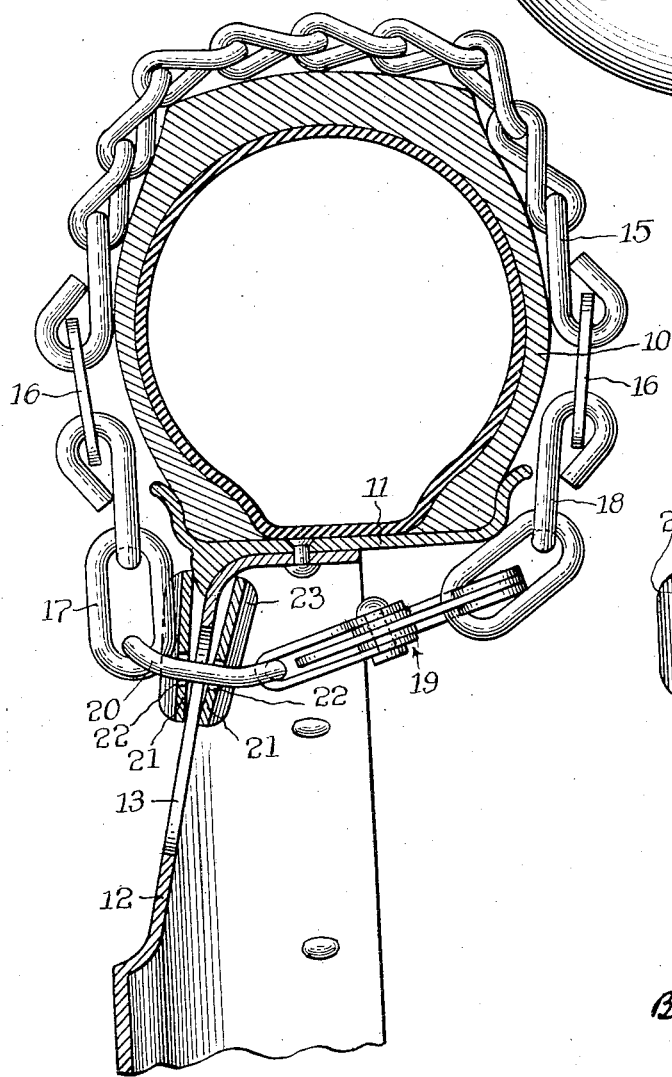
Fig. 2 is a fragmentary sectional view, on an enlarged scale, through a tire and wheel assembly, and is taken along the line 2—2 of Fig. 1.
Figure 3:
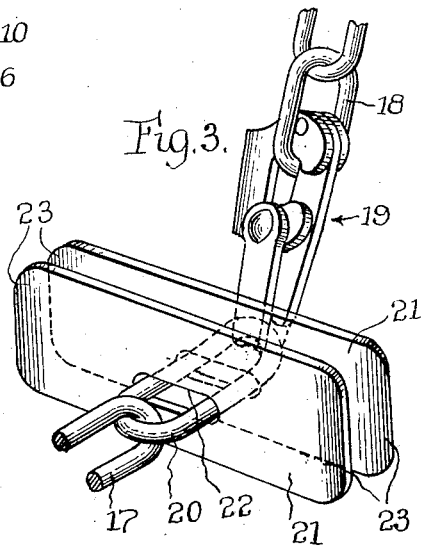
Fig. 3 is a fragmentary perspective view showing the means for holding the chain against slipping.

In use and operation, the plates are disposed one on either side of the disk wheel 13 as shown in Fig. 2, the looseness of the plates on the link 20 permitting one of the plates to be readily turned endwise and passed through an aperture 13 in the disk wheel. After a connection between the ends of the connecting means 17 and 18 has been established by the fastening device 19, it will be evident that the two plates 21 will hold the tire chain device in its proper position relative to the wheel assembly. The looseness of the plates on the link, however, allows the device to shift, to a very limited extent, under actual operating conditions, but such movement is, of course, insufficient to allow the road engaging section of the device to become displaced relative to the tread of the tire. Preferably, the ends of the plates are turned outwardly, as at 23, to facilitate separation of the plates prior to the insertion of one of them through an aperture 13 and to avoid damage to the disk wheel by the ends of the plates.

While the present device has been described in connection with a disk wheel, it will be obvious that the device will function satisfactorily when installed on wheel assemblies embodying other types of radial supporting means for the tire and rim.

I claim as my invention:

1. An emergency tire chain device comprising the combination of a plurality of elongated road engaging chains adapted to fit across the tread of a tire, supporting cross bars connected with the ends of said chains, fastening chains centrally connected with an intermediate portion of each cross bar and arranged to extend therefrom about the tire supporting assembly to a meeting point opposite to the tire tread, means for detachably connecting said fastening chains together, one of said fastening chains having a longitudinally arcuate link arranged in assembly to extend through an aperture in the wheel, and a pair of plates through which said link loosely extends, said plates being engageable with opposite sides of said wheel and being limited against movement longitudinally of the chain and against relative separating movement from each other by engagement of the plates with the links adjacent to said arcuate link whereby the engagement of said plates with the wheel prevents substantial movement of the device about the tire.

2. An emergency tire chain device comprising, in combination, means adapted to fit about a tire including a road engaging section and means for detachably connecting said section in place on the tire, a pair of plates loosely carried by said device to extend laterally therefrom and adapted in assembly for disposition one on each side of a part of the wheel assembly for opposed engagement therewith, and means for limiting the extent of relative separation of said plates.

3. An emergency tire chain device comprising in combination, means adapted to fit about a tire including a road engaging section and means for detachably connecting said section in proper relation to the tread of the tire, and means carried by said device and having limited relative movement longitudinally thereof for disposition on each side of a rim supporting part of the wheel assembly.

4. In an emergency device of the character described, the combination of an auxiliary traction assembly adapted to be secured in circumferential relation about a tire and rim structure, and a pair of loose members extending laterally from said assembly for engagement one with each side of the part for supporting the wheel and rim and preventing transverse creeping about the tire.

5. A tire chain device of the character described, comprising, in combination, means adapted to fit about a tire including a road engaging section and a flexible element for connecting said section in place on the tire, and means carried by and having limited relative movement longitudinaly of said element and extending transversely of the latter to engage a part of the rim supporting structure of the wheel assembly, whereby said device will be limited against transverse creeping about the tire.

EARL STULLER.